United States Patent [19]
Lee

[11] Patent Number: 6,026,683
[45] Date of Patent: Feb. 22, 2000

[54] LIQUID LEVEL/VOLUME MEASURING SYSTEM USING STRAIN-GAUGE LOAD CELL AND METHOD OF MEASURING LIQUID LEVEL/VOLUME

[75] Inventor: Buyong Lee, Kyungnam, Rep. of Korea

[73] Assignee: Yongmacom Co., Ltd., Seoul, Rep. of Korea

[21] Appl. No.: 09/110,387

[22] Filed: Jul. 7, 1998

[30] Foreign Application Priority Data

Jul. 9, 1997 [KR] Rep. of Korea ........................ 97-31797

[51] Int. Cl.$^7$ .................................................. G01F 23/30
[52] U.S. Cl. ............................................................ 73/309
[58] Field of Search ............................. 73/149, 296, 305, 73/312, 313, 309

[56] References Cited

U.S. PATENT DOCUMENTS

| | | | |
|---|---|---|---|
| 3,795,140 | 3/1974 | Nishihara | 73/309 X |
| 4,813,275 | 3/1989 | Castor | 73/309 X |
| 4,986,113 | 1/1991 | Harrison et al. | 73/309 X |
| 5,132,923 | 7/1992 | Crawford et al. | 73/309 X |
| 5,136,883 | 8/1992 | Jannotta | 73/309 |
| 5,157,968 | 10/1992 | Zfira | 73/149 |
| 5,315,873 | 5/1994 | Jin | 73/309 |
| 5,744,716 | 4/1998 | Mimken et al. | 73/309 X |

*Primary Examiner*—Richard Chilcot
*Assistant Examiner*—Jewel V. Thompson
*Attorney, Agent, or Firm*—McDermott, Will & Emery

[57] ABSTRACT

A liquid level measuring system using a strain-gauge load cell is disclosed. The system includs a buoyancy weight standing upright in a liquid held in an object to be measured in a long bar shape, and having an average density substantially the same as that of the liquid; the strain-gauge load cell producing a change in the buoyancy weight varied with the liquid level as a change of an electrical signal; an amplifier amplifying a voltage signal detected from the strain-gauge load cell; an analog/digital converter converting an amplified voltage signal into a digital signal; a central processing unit applying a driving pulse to the strain-gauge load cell and average-operating a plurality of digital signals to find an average value of the liquid level; and a display displaying the average value of the liquid level as a number.

8 Claims, 4 Drawing Sheets

LIQUID LEVEL/VOLUME MEASURING SYSTEM USING STRAIN-GAUGE LOAD CELL AND METHOD OF MEASURING LIQUID LEVEL/VOLUME

BACKGROUND OF THE INVENTION

1. Field of the Invention

The present invention relates to a liquid level and/or volume measuring system using a strain-gauge load cell and a method of measuring a liquid level and/or volume. More particularly, it relates to a liquid level and/or volume measuring system which detects a weight change of a float according to a change in liquid level of a liquid tank using a strain-gauge load cell and signal-processes an detected signal to measure a liquid level and/or liquid volume in high precision, and further relates to a method of measuring a liquid level and/or volume.

2. Description of the Related Art

It is necessary to accurately measure the underground water level, the remainder, or the amount of leaked or evaporated liquid in a fuel tank or a raw material tank of various plants for control of reminder or for smooth raw material supply to the production line.

Most conventional measuring methods to obtain data for the remaining liquid employ a float, and are divided into the following:

(A). First method is that a float is set on the surface of the liquid, and a variation of the variable resistance is measured from the float moving according to a variation in the liquid level by means of a lever.

(B). Second method is that the tension of lines connected to the float is analyzed to move the rotating body, thus measuring a turning volume.

(C). Third method is that a pressure gauge is put in the liquid to measure a variation of the pressure.

(D). Fourth method is that sound wave or light flux is emitted to the surface of the liquid to measure the time of returning.

According to the A and B methods, a float is provided to an object to be measured, for measuring displacement of a contact or variation of a rotation angle. A minute variation, e.g. a variation less than 0.01 cm cannot be measured because of an error by friction force produced at each support or an error created by measuring a rotation angle, and its measuring apparatus is too complicated to increase the production costs.

In the above C method, a minute measurement is impossible by using a variation in the pressure, and a double measurement must be essentially carried out because of an error due to the temperature and atmospheric pressure. In case of measuring water under the ground to the depth of 100 m or more, the measuring apparatus may be damaged by a shock wave due to falling water leaked into tube.

In addition, the D method also creates a lot of errors according to condition of atmospher, temperature, humidity, and shape of the liquid surface.

SUMMARY OF THE INVENTION

It is a primary objective of the present invention to provide a liquid level and/or volume measuring system which is capable of measuring a minute variation in the liquid level and/or volume to a high degree by detecting a weight change of a buoyant weight according to a change in liquid level of a liquid tank or underwater to be measured by the use of a strain-gauge load cell and signal processing an detected signal.

It is a second objective of the present invention to provide a liquid level and/or volume measuring system which has a measuring sensor of very simple structure without a physical moving part so maintenance work due to a variation in friction force is not necessary and its durability is semipermanent and its production costs are low, and absolute buoyancy value is constant even if the liquid density is varied with temperature, and a varied value can be easily measured by an electric signal without extra conversion and correction, and a method of measuring a liquid level and/or volume.

In order to achieve the above objectives, the present invention provides a liquid level measuring system for measuring a liquid level of a liquid held in an object to be measured, including: a buoyancy weight standing upright in the liquid held in the object in a long bar shape, and having an average density substantially the same as that of the liquid; a strain-gauge load cell for producing a change in the buoyancy weight varied with the liquid level as a change of an electrical signal; amplifying means for amplifying a voltage signal detected from the strain-gauge load cell; analog/digital converting means for converting the amplified voltage signal into a digital signal; control means for applying a driving pulse to the strain-gauge load cell repeatedly and average-operating a plurality of obtained digital signals to find an average value of the liquid level; and display means for displaying the average value of the liquid level as a number.

The inventive system further includes an auxiliary pipe communicating the liquid in the object to be measured and surrounding the buoyancy weight to prevent displacement of the buoyancy weight by the flow of the liquid within the object to be measured; identification number setting means for setting an identification number; and a serial data communication interface for transmitting measured data to a control personal computer. The object to be measured is one of a liquid tank or underwater.

According to another aspect of the present invention, a method of measuring a liquid level of a liquid held in an object to be measured includes the steps of detecting as an electrical signal a weight variation of a buoyancy weight varied with the liquid level by the use of the buoyancy weight installed vertically in the object to be measured and having an average density substantially similar to the density of the liquid to be measured; amplifying a voltage signal detected from a strain-gauge load cell connected to the buoyancy weight and converting the amplified voltage signal into a digital signal; and signal-processing the digital signal to find a value of the liquid level.

The object to be measured is a liquid tank, and the value of the liquid level is obtained on the basis of the size of the liquid tank.

The step of finding the value of the liquid level includes the sub-steps of removing an erroneous value of detected signals produced by a plurality of numbers; and obtaining an arithmetic mean of the detected signals from which erroneous value is removed.

DETAILED DESCRIPTION OF THE PREFERRED EMBODIMENTS

Preferred embodiments will be now described with reference to the accompanying drawings.

Figure 1:
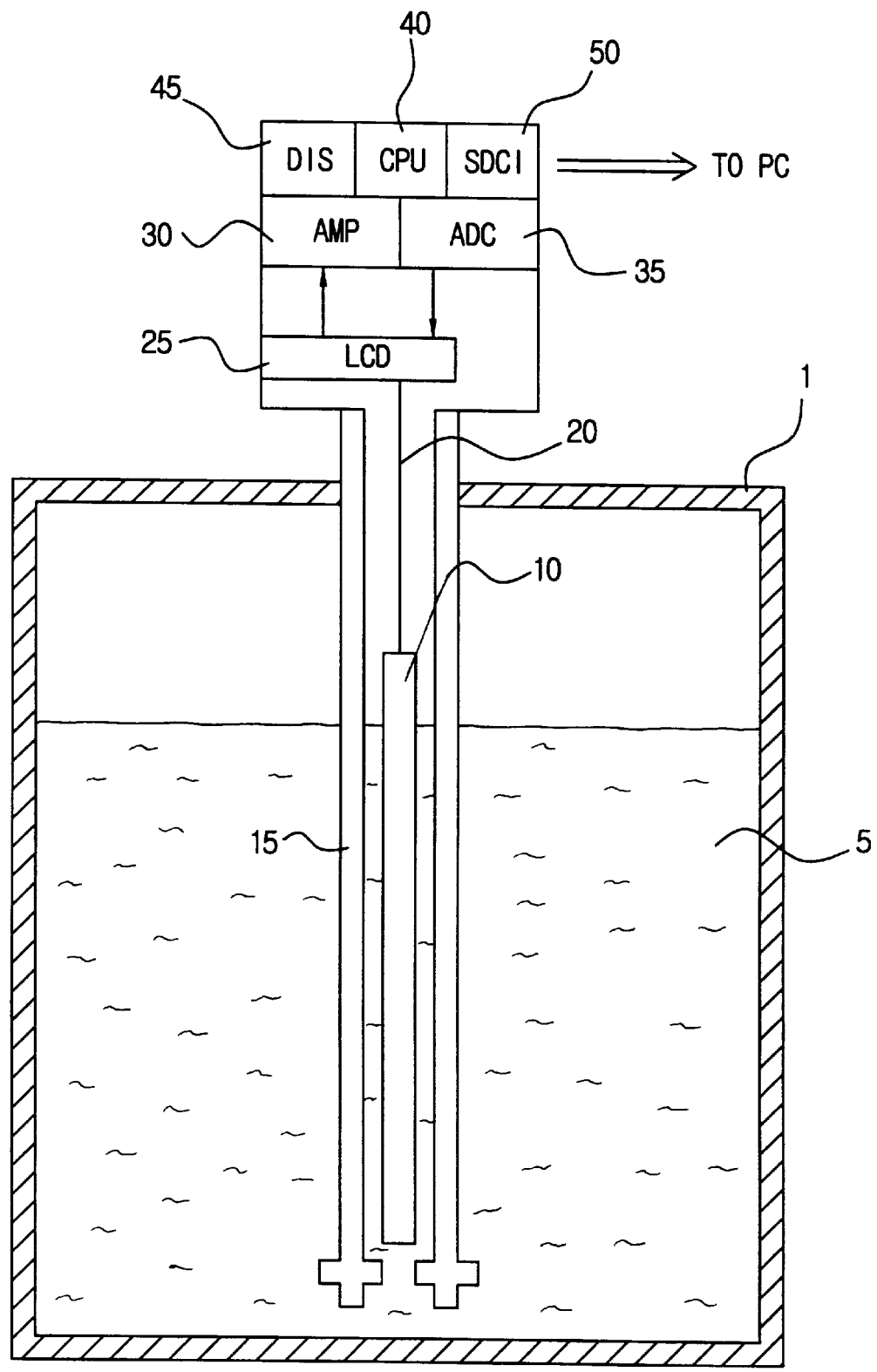
FIG. 1 is a schematic view of the overall structure of a liquid level and/or volume measuring system using a strain-gauge load cell in accordance with the present invention.

Referring to FIG. 1, the inventive liquid level and/or volume measuring system by the use of a strain-gauge load cell includes a buoyancy weight 10 put in a liquid tank 1 to measure the level of a liquid 5 within liquid tank 1; a bamboo tube-shaped auxiliary pipe 15 installed outside of the buoyancy weight 10 and having a partially-opened lower section in order to prevent buoyancy weight 10 from shaking.

The buoyancy weight 10 has a hollow and closed interior, and its average density is substantially similar to the liquid to be measured, which enhances the accuracy of measurement. The buoyancy weight 10 are connected to a strain-gauge load cell (LDC) 25 through a line 20, and an output of load cell 25 is sent through an amplifier 30 to an analog/digital converter (ADC) 35 which converts an analog signal into a digital signal.

An output of ADC 35 is applied to an input of a central processing unit CPU 40 which processes a detected signal, computes a variation of the liquid level and/or volume, and controls outputs to each of a display DIS 45 and a communication interface SDCI 50, and the overall system. Communication interface 50 includes RS-232C, RS-422 or RS-485, and connects the present measuring system to a control personal computer (PC).

Figure 2:
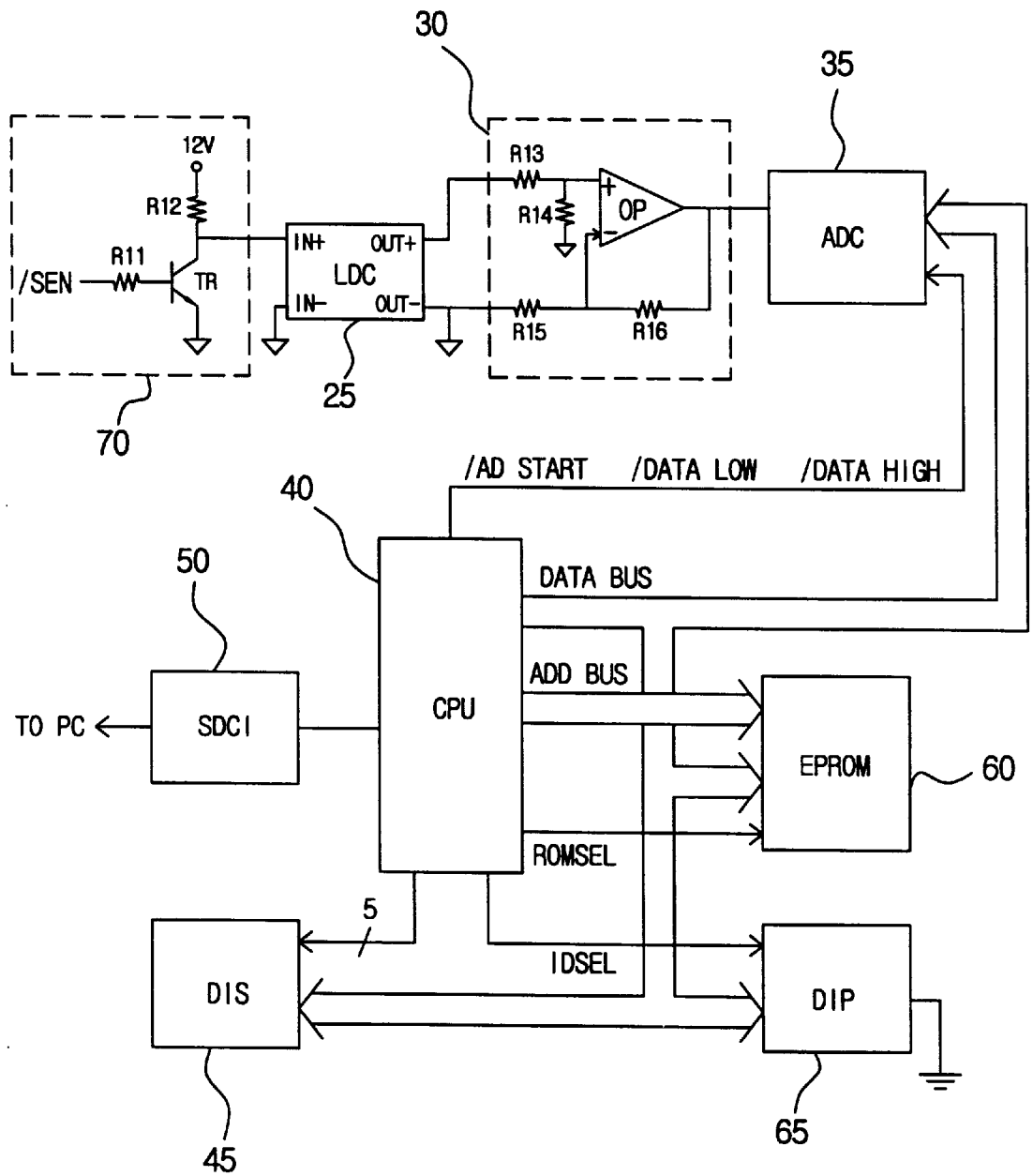
FIG. 2 is a circuit diagram of the liquid level and/or volume measuring system of FIG. 1.

Referring to FIG. 2, the circuit construction of the inventive system's signal processing part is now described in detail.

A switching circuit 70, having a transistor TR and resistors R11 and R12 and turned off upon application of a sensor driving pulse /SEN from CPU 40, is connected to an input IN+ of LDC 25 to start the operation of load cell 25, and a non-inverting amplifier 30 having an amplification factor of about 1000 times includes an operating amplifier (OP) and resistors R13 to R16 for amplifying detected voltage signal to a signal suitable for analog/digital conversion at an output OUT+ of load cell 25.

An output of amplifier 30 is connected to an input of analog/digital converter (ADC) 35 which converts an analog signal into a 16-bit digital signal in response to a start signal (/AD START) of CPU 40, and its digital data is applied to the input of CPU 40. CPU 40 has a function of displaying a signal, processed from a digital signal converted by ADC 35 with respect to a signal detected from load cell 25, on display 45; a function of transmitting data to be either transmitted to or received from the control personal computer PC; and a function of reading out the identification number of the system set in a DIP switch 65 and storing it.

CPU 40 has an erasable and programmable memory EPROM 60 storing a program necessary for the system control, and for example, when CPU 40 consists of an 8-bit microprocessor, it is connected via an 8-bit data bus (DATA BUS) and a 16-bit address bus (ADD BUS).

CPU 40 is connected to display 45 for displaying a value of liquid level and/or volume, obtained by signal processing of a voltage signal detected through the above data bus, as e.g. a five-digit number. If controlling a plurality of measuring systems with a single remote personal computer PC, dip switch DIP 65 for producing its intrinsic numbering is connected through the data bus, and its identification number consists of 8 bits so the PC is capable of controlling 256 measuring systems. The CPU 40 is connected to RS-232, RS-485, or RS-422 communication interface 50 for transmitting the detected data by serial data communication with the remote control personal computer PC.

Figure 4:
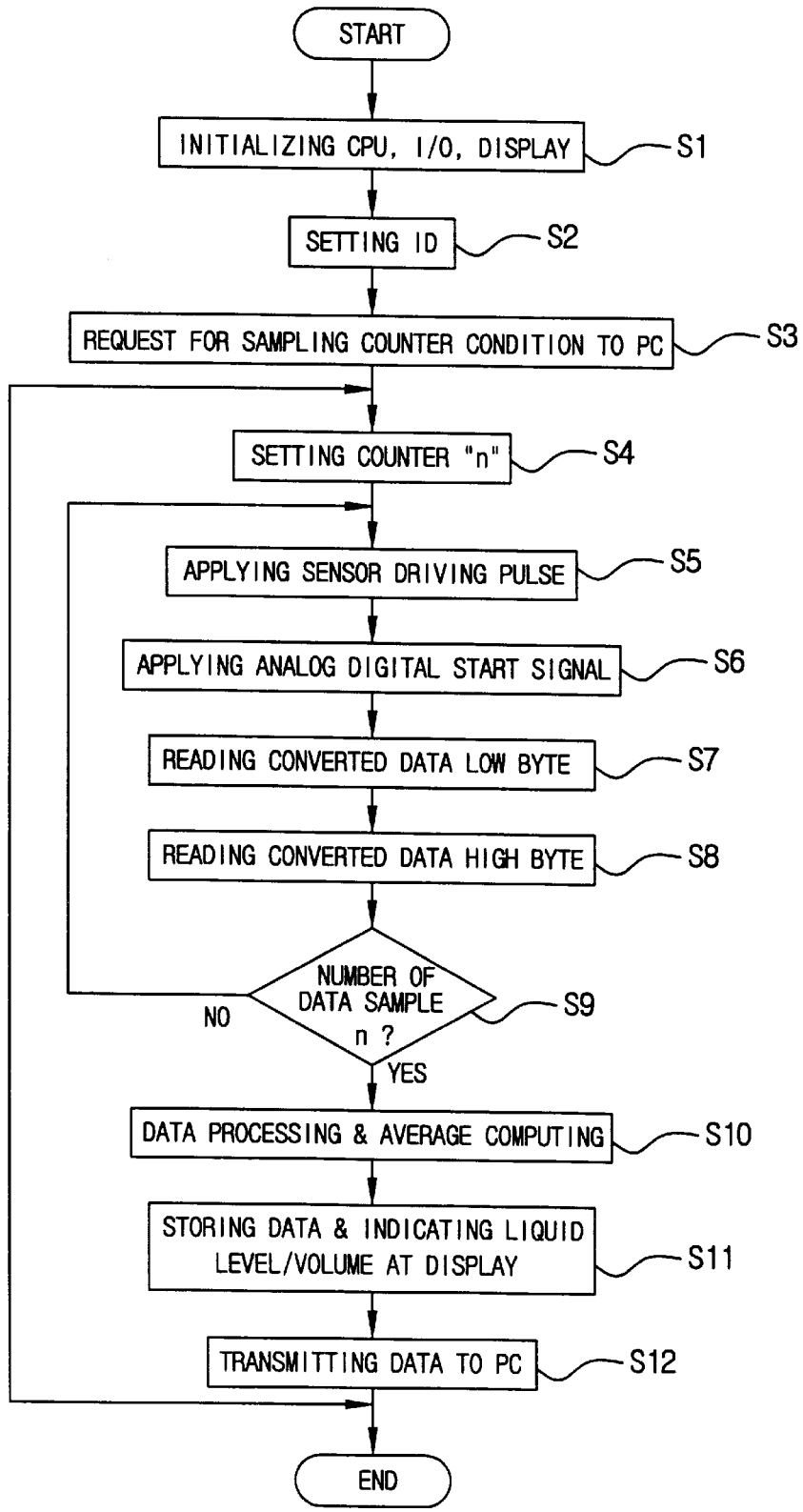
FIG. 4 is a flow chart of explaining a method of measuring the liquid level and/or volume by the use of a strain-gauge load cell.

The operation of the inventive liquid level and/or volume measuring system using the strain-gauge load cell is now described with reference to FIG. 4.

Once power is applied to the system, CPU 40 reads out a control program stored in EPROM 60 and initializes CPU 40's register, an external input/output means (I/O), and display 45 in order in step S1. A chip selection signal IDSEL is applied to dip switch 65 so the identification number of the system set in dip switch 65 is read out for setting in step S2.

Next, the CPU 40 asks the control PC the operation start to a sampling counter through a serial data communication interface (SDCI) 50, and requests the counting cycle and the sampling number n. If CPU 40 receives the setting conditions in step S3, it sets a sampling number n in the internal counter in step S4.

The sampling number n set in the counter is indicative of the number n of detecting data from load cell LDC 25, and the multiple-numbered measurement is to remove data of erroneous value due to the noise created by signal processing and enhance the reliability of the data by averaging normal data. Preferably, the number of sampling n is 10.

Then, CPU 40 applies a sensor driving pulse /SEN to switching circuit 70 to turn off the transistor TR so that 12V is applied to input IN+ of load cell LDC 25 in step S5. At the same time, CPU 40 applies a control signal /AD START starting analog-to-digital conversion with respect to an analog signal input to ADC 35 in step S6.

As shown in FIG. 1, when a buoyancy weight 10 stands upright in liquid 5, it receives buoyance corresponding to the liquid level of the remainder of liquid 5 held in liquid tank 1. As the liquid level descends, the volume of buoyancy weight 10 sinking in liquid 5 is decreased so that the weight of buoyancy weight 10 is increased contrary to the level of the liquid.

Figure 3:
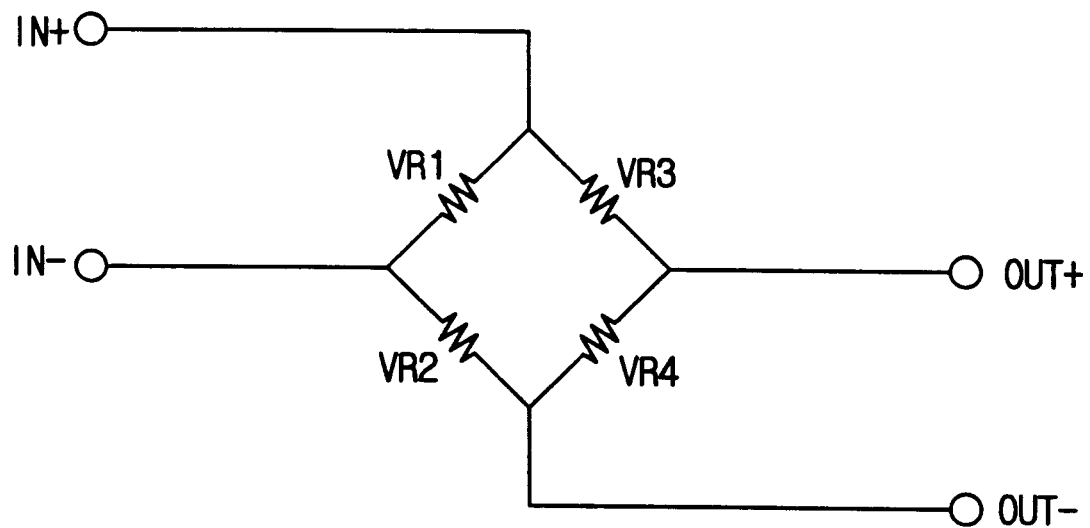
FIG. 3 depicts an equivalent circuit of a load cell of FIG. 2.

LDC 25 can be represented as an equivalent circuit connected to four variable resistors VR1 to VR4, as shown in FIG. 3, and in case of the strain-gauge type, as the weight of buoyancy weight 10 is changed, variable resistors VR1 to VR4 are varied, so that an output voltage Vo detected from an output OUT+ of LDC 25 is obtained as 0 to 4.8 mV.

If the buoyancy weight 10 is increased in weight as the liquid level descends, the output voltage Vo from output OUT+ of LDC 25 becomes increased. Output voltage Vo is applied to a non-inverting input terminal of operating amplifier OP through resistor R13, and the 1000-time signal amplification is made by the amplification of non-inverting amplifier 30.

The amplified signal is applied to ADC 35 to be converted into a 16-bit digital signal. CPU 40 applies /DATALOW and /DATAHIGH control signals to ADC 35, and the 16-bit digital signal is divided into low byte and high byte by two so CPU 40 receives the converted digital data by 8 bits in steps S7 and S8.

In step S9, the CPU 40 determines if the sampling of measured data reaches to sampling number n set in the counter. When it approaches the sampling number n, CPU 40 finds an average as to normal data obtained according to the liquid or the noise by determining the input data sampling value in step S10.

The average of the level of the liquid level is stored and its data value D0 to D7 are produced to display 45 through data bus DATA BUS, so the data value is indicated as a five-digit number in step S11.

The average data from the measuring system is sent to the personal computer PC through the communication interface SDCI 50 such as RS-232 with the identification number ID of the measuring system in step S12. When analyzing digital data converted from the analog measured value by 10,000 steps or more, the measurement of liquid level with resolving power of 0.01% or more is assured. It is possible to maintain the resolving power of 20,000 steps among the 65,536 steps by using a 16-bit ADC, and the accuracy can be enhanced by the development of the semiconductor integration technique.

The liquid level and the liquid volume can be immediately computed using a volume conversion function program according to the shape of a liquid vessel. When measuring liquid of density 1 by the use of a buoyancy weight of diameter 2.75 cm and length 20 cm with accuracy of $\frac{1}{20,000}$ and a load cell of 120 g capacity, a change in the liquid level to 0.001 cm (0.01 mm), for example, $\frac{1}{20,000}$ of the height of the liquid tank 20 cm, can be measured.

If the liquid vessel is a cylindrical tank of 200 cm in diameter, the capacity change of 100×100×3.14×0.001=31.4 cc can be measured. As another example, measuring liquid of density 1 by the use of a buoyancy weight of diameter 2.5 cm and length 40 m with accuracy of $\frac{1}{20,000}$ and a load cell of 20,000 g capacity, a change in the liquid level to 0.002 m (0.2 cm), $\frac{1}{20,000}$ of the height of the liquid tank 20 cm, can be measured.

In the present invention, a first body of buoyancy weight, a line and a load cell; a second body of an amplifier, ADC and communication interface; and a third body of a display. For the precise measurement, they make into two or one.

As described above, in the present invention, a change in the weight of buoyance weight according to the liquid level of a liquid tank or the level of underwater to be measured, is signal-processed to measure a change in the minute liquid level and/or liquid volume by superhigh level. In addition, the construction of the sensor is very simple and the production costs are low, and the sensor has no physical moving part, so maintenance work due to a variation in the friction force is not necessary and its durability is semipermanent. An absolute buoyancy value is constant even if the liquid density is varied with temperature, and a varied value is easily measured by an electric signal without extra conversion and correction. In addition, the present invention easily measures a variation in the liquid level and/or liquid volume of plural objects to be measured located in a plurality of remote areas by the data communication, and can be utilized in the automation of industrial facilities.

What is claimed is:

1. A liquid level measuring system for measuring a level of a liquid in a structure, comprising:
   a buoyancy weight immovably supported in the structure and standing upright in the liquid, said buoyancy weight having an elongate bar shape, and an average density substantially the same as that of the liquid;
   a strain-gauge load cell for indicating, in the form of a voltage signal, a change in a weight of the buoyancy weight caused by a change in liquid level in the structure;
   amplifying means for amplifying the voltage signal from the strain-gauge load cell;
   analog/digital converting means for converting the amplified voltage signal into a digital signal;
   control means for repeatedly applying a driving pulse to the strain-gauge load cell and for average-operating a plurality of digital signals produced by the analog/digital converting means to determine an average value of the liquid level; and
   display means for displaying the average value of the liquid level as a number.

2. A liquid level measuring system according to claim 1, further comprising an auxiliary pipe said auxiliary pipe being supported in the structure and surrounding the buoyancy weight to prevent displacement of the buoyancy weight by liquid movement within the structure.

3. A liquid level measuring system according to claim 1, wherein said buoyancy weight has an enclosed interior.

4. A liquid level measuring system for measuring a level of a liquid in a structure, comprising:
   a buoyancy weight supported in the structure and standing upright in the liquid, said buoyancy weight having an elongate bar shape, and an average density substantially the same as that of the liquid;
   a strain-gauge load cell for indicating, in the form of a voltage signal, a change in a weight of the buoyancy weight caused by a change in the liquid level in the structure;
   amplifying means for amplifying the voltage signal from the strain-gauge load cell;
   analog/digital converting means for converting the amplified voltage signal into a digital signal;
   control means for repeatedly applying a driving pulse to the strain-gauge load cell and for average-operating a plurality of digital signals produced by the analog/digital converting means to determine an average value of the liquid level;
   display means for displaying the average value of the liquid level as a number;
   identification number setting means for setting an identification number; and
   a serial data communication interface for transmitting the measured data to a control personal computer which is located in a remote site.

5. A liquid level measuring system according to claim 1, wherein the structure is one of a liquid tank and an underground cavity.

6. A method of measuring a level of a liquid in a structure comprising the steps of:
   detecting, as an electrical signal, a weight variation of a buoyancy weight which varies with a change in liquid level, using a buoyancy weight which is immovably supported in the structure so as be essentially vertical therein, said buoyancy weight having an average density substantially similar to the density of the liquid to be measured;
   amplifying a voltage signal detected by a strain-gauge load cell connected to the buoyancy weight;
   converting the amplified voltage signal into a digital signal; and
   signal-processing the digital signal to determine a value of the liquid level.

7. A method according to claim 6, wherein the structure to be measured is a liquid tank, and further comprising the step of obtaining a value of a liquid volume on a basis of a shape of the liquid tank.

8. A method of measuring a level of a liquid in a structure comprising the steps of:
   detecting, as an electrical signal, a weight variation of a buoyancy weight which varies with a change in liquid level, using a buoyancy weight which is supported in the structure so as be essentially vertical therein, said buoyancy weight having an average density substantially similar to the density of the liquid to be measured;

amplifying a voltage signal detected by a strain-gauge load cell connected to the buoyancy weight;

converting the amplified voltage signal into a digital signal; and signal-processing the digital signal to determine a value of the liquid level;

wherein the step of determining the value of the liquid level includes the steps of:

repeatedly detecting a plurality of values of the liquid level;

removing an erroneous value from the repeatedly detected plurality of liquid level values; and obtaining an arithmetic mean of the detected signals from which the erroneous value is removed.

* * * * *